UNITED STATES PATENT OFFICE.

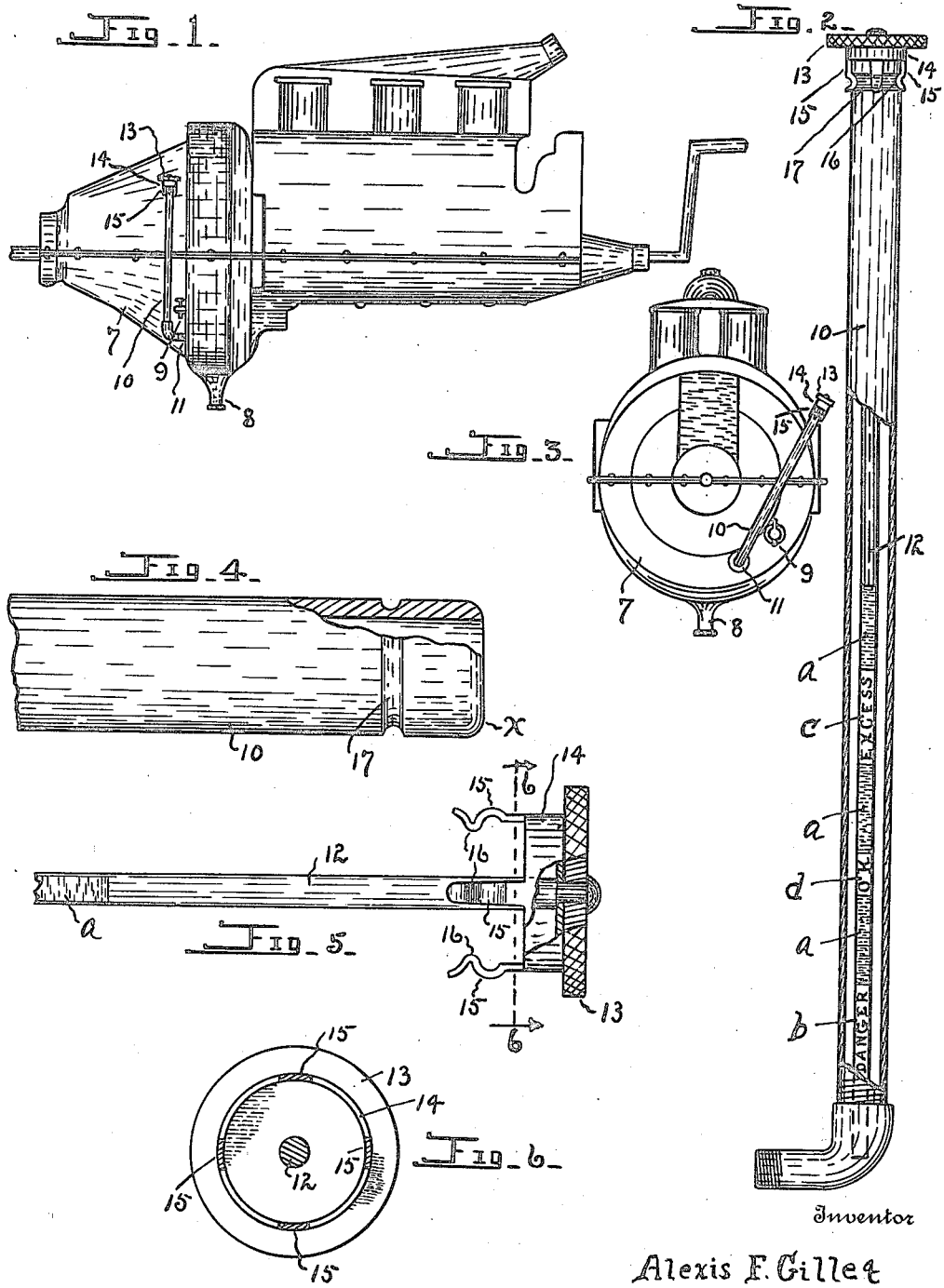

ALEXIS F. GILLET, OF OMAHA, NEBRASKA, ASSIGNOR TO JUBILEE MANUFACTURING COMPANY, OF OMAHA, NEBRASKA, A CORPORATION.

OIL-LEVEL INDICATING ATTACHMENT FOR CRANK CASES.

1,423,558.  Specification of Letters Patent.  Patented July 25, 1922.

Application filed October 4, 1920. Serial No. 414,447.

*To all whom it may concern:*

Be it known that I, ALEXIS F. GILLET, a citizen of the United States, residing at Omaha, in the county of Douglas and State of Nebraska, have invented certain new and useful Improvements in an Oil-Level Indicating Attachment for Crank Cases, of which the following is a specification.

This invention has for its object to provide a tubular sump having an intake port communicating with the lower part of the crank case of an engine and provided with an indicating-rod for insertion therein and removable therefrom for acertaining the quantity of oil in the crank case, the mounting of the rod upon the tubular oil-sump to be such that dust will be excluded, and that removal of the rod may be readily and conveniently effected.

The novel and useful features of construction are fully described herein and in the appended claim, and are illustrated in the accompanying drawing, wherein,—

Fig. 1 is a side view of an engine showing the crank case provided with the attachment. Fig. 2 is a broken away side view of the device. Fig. 3 is an end view of an engine showing the device mounted thereon. Fig. 4 is an enlarged detail showing a part of the tubular sump. Fig. 5 is a detail showing a part of the indicating-rod. Fig. 6 is a sectional view on line 6—6 of Fig. 5.

Referring now to the drawing, the invention is illustrated in connection with an engine having a crank case 7. It will be understood that, for operation, the crank case is supplied with a certain quantity of oil, and that an excess of oil is not desirable, and that the supply of oil must not become exhausted. Also it will be understood that drainage of the oil by use of a drain cock 8, is occasionally required; and upon engines used for automobiles of a certain conventional type oil-level, indicating cocks are employed and disposed one above the other for ascertaining the quantity of oil in the crank case, as indicated at 9, these being in communication with the case near the bottom thereof.

The use of the oil-level indicating cocks mentioned is attended with considerable inconvenience for the reason that they are located below other mechanism, comparatively near the ground and between the running-boards of an automobile where access is extremely difficult. Also it is obvious that the use of oil-level indicating cocks will not disclose the depth of oil in that part of the crank case between the upper and lower cocks.

In order that the quantity of oil in the crank case may be readily, accurately and conveniently ascertained, I remove the lowermost oil-level indicating cock and mount in the port thus provided a tubular sump 10 having a suitable length so that its outer open end will be disposed at such a distance from its intake port 11 that operation will be convenient for measuring the oil.

Numeral 12 indicates an indicating-rod having a length nearly equal to the length of the tubular sump, and adapted to be inserted therein. It is provided at its outer end with a head or handle-member 13 preferably of disc-form for use in drawing it from or inserting it in the sump, its inner end-portion preferably having a flat surface, as indicated at $a$, and being provided at longitudinal intervals with indicating characters, as the lowermost character or word at $b$ to indicate that there is a lack of oil in the crank case, and other characters $c$ and $d$ indicating, respectively, an excess of oil and a correct supply of oil in the crank case.

Since oil will be elevated to its own level and will adhere to the rod, the supply of oil in the tubular sump will be indicated by the rod when withdrawn to correctly determine the supply of oil within the crank case; and the advantages of the device will be appreciated since the supply of oil may be readily ascertained, and the difficulty heretofore experienced in this regard may be practically eliminated.

In order that dust will not enter the sump, the rod, inwardly of the disc, is provided with a cap or barrel 14 which, normally surrounds the outer end-portion of the tubular sump, and for convenience in operation and as a locking means, suitable fastening devices are employed, the cap or barrel 14 being provided with latch-members or resilient prongs 15 each having an inwardly projecting part or ridge 16 for engaging in a catch-member or annular groove 17, provided for the tubular sump near its outer end, the latter being of convexed form, as indicated at $x$ (Fig. 4), and in operation, when moving the rod 12 inwardly to its normal position, the ridges 16 will first engage the convexed surface $x$ and the resilient prongs will be pressed outwardly and will slide upon the wall of the sump until they enter the groove 17, and the prongs, when thus disposed, will prevent accidental removal of the rod and will maintain the circular wall of the cap in engagement with the end of the sump, and in conjunction with the cap will prevent dust from entering. The rod may be manually withdrawn from the sump against the force of the resilient prongs, the handle or disc being used for this purpose.

While I have shown and described detailed construction, this has been for the purpose of explaining the preferred features and I do not wish to be understood as limiting myself to exactness in this respect; and changes in form, size, proportion and minor details may be made as found to be of advantage, said changes to be within the scope of the invention as claimed.

I claim:

In an oil-level indicating attachment for a crank case, a tube having a convexed terminal and a circular groove, a rod provided with indicating characters, a disc disposed transversely of and mounted on the end of said rod, a circular cap provided with curved prongs, said cap having a lesser diameter than the diameter of the disc and having its top in engagement with the rod and disc, said rod being adapted to have a movement inwardly to dispose its circular cap outwardly of the tube, the curved prongs of the cap moving upon the convexed terminal and engaging in the circular groove of said tube.

In testimony whereof I have affixed my signature in presence of two witnesses.

ALEXIS F. GILLET.

Witnesses:
 HIRAM A. STURGES,
 ARTHUR H. STURGES.